United States Patent
Chang et al.

(10) Patent No.: US 10,718,537 B2
(45) Date of Patent: Jul. 21, 2020

(54) ADJUSTING SYSTEM AND METHOD FOR AN AIR CONDITIONING CHILLER

(71) Applicant: Chicony Power Technology Co., Ltd., New Taipei (TW)

(72) Inventors: Tse-Wen Chang, New Taipei (TW); Cheng-Yi Ho, New Taipei (TW)

(73) Assignee: CHICONY POWER TECHNOLOGY CO., LTD., New Taipei (TW)

( * ) Notice: Subject to any disclaimer, the term of this patent is extended or adjusted under 35 U.S.C. 154(b) by 154 days.

(21) Appl. No.: 15/686,145

(22) Filed: Aug. 24, 2017

(65) Prior Publication Data

US 2018/0372353 A1 Dec. 27, 2018

(30) Foreign Application Priority Data

Jun. 26, 2017 (TW) .............................. 106121303 A

(51) Int. Cl.
*F24F 11/00* (2018.01)
*G05B 19/048* (2006.01)
(Continued)

(52) U.S. Cl.
CPC .............. *F24F 11/30* (2018.01); *F24F 11/46* (2018.01); *F24F 11/83* (2018.01); *G05B 15/02* (2013.01);
(Continued)

(58) Field of Classification Search
CPC .... F24F 11/006; F24F 11/008; F24F 11/0012; F24F 11/0015; F24F 2011/0013;
(Continued)

(56) References Cited

U.S. PATENT DOCUMENTS

| 8,091,375 B2 | 1/2012 | Crawford |
| 2006/0065750 A1* | 3/2006 | Fairless .................. F23N 5/203 |
| | | 236/46 R |

(Continued)

FOREIGN PATENT DOCUMENTS

| CN | 202648063 U | 1/2013 |
| CN | 102207322 B | 8/2014 |

(Continued)

Primary Examiner — Rocio Del Mar Perez-Velez
Assistant Examiner — Olvin Lopez Alvarez
(74) Attorney, Agent, or Firm — CKC & Partners Co., LLC

(57) ABSTRACT

An adjusting system includes a system optimization device, a central control device, at least one air conditioning load device, at least one indoor area environment sensing device, and at least one outdoor area external environment sensing device. The at least one air conditioning load device is configured to obtain an air conditioning load parameter according to an air conditioning load in the space area. The at least one indoor area environment sensing device is configured to obtain an indoor environment parameter. The at least one outdoor area external environment sensing device is configured to obtain an outdoor environment parameter. The system optimization device receives the indoor environment parameter, the outdoor environment parameter, and the air conditioning load parameter and calculates to obtain a control parameter. The central control device controls the supply temperature of the water chiller according to the control parameter.

16 Claims, 3 Drawing Sheets

(51) Int. Cl.
- *F24F 11/30* (2018.01)
- *F24F 11/46* (2018.01)
- *F24F 11/83* (2018.01)
- *G05B 15/02* (2006.01)
- *F24F 110/12* (2018.01)
- *F24F 11/63* (2018.01)
- *F24F 140/50* (2018.01)
- *F24F 11/64* (2018.01)
- *F24F 110/20* (2018.01)
- *F24F 140/20* (2018.01)
- *F24F 110/10* (2018.01)
- *F24F 11/62* (2018.01)
- *F24F 130/20* (2018.01)
- *F24F 110/22* (2018.01)

(52) U.S. Cl.
CPC ............ *G05B 19/048* (2013.01); *F24F 11/62* (2018.01); *F24F 11/63* (2018.01); *F24F 11/64* (2018.01); *F24F 2110/10* (2018.01); *F24F 2110/12* (2018.01); *F24F 2110/20* (2018.01); *F24F 2110/22* (2018.01); *F24F 2130/20* (2018.01); *F24F 2140/20* (2018.01); *F24F 2140/50* (2018.01); *G05B 2219/2614* (2013.01)

(58) Field of Classification Search
CPC ....... F24F 2011/0049; F24F 2011/0075; F24F 2011/0061; F24F 2011/0063; F24F 2011/0046; F24F 2011/0045; F24F 2011/0016; F24F 11/83; F24F 11/30; F24F 11/62; F24F 2110/12; F24F 2110/20; F24F 2140/50; F24F 11/64; F24F 2110/10; F24F 2130/20; F24F 2140/20; F24F 2110/22; F24F 11/46; F24F 11/63; G05B 19/048; G05B 2219/2614

See application file for complete search history.

(56) References Cited

U.S. PATENT DOCUMENTS

| | | | | |
|---|---|---|---|---|
| 2007/0107450 A1* | 5/2007 | Sasao | F24F 11/0008 | 62/185 |
| 2008/0116289 A1* | 5/2008 | Lochtefeld | F24F 3/06 | 237/81 |
| 2008/0234869 A1* | 9/2008 | Yonezawa | F24F 11/30 | 700/276 |
| 2012/0131935 A1* | 5/2012 | Kim | F24F 3/0442 | 62/115 |
| 2013/0098597 A1* | 4/2013 | Fujimoto | H05K 7/20745 | 165/287 |
| 2013/0110306 A1* | 5/2013 | Wang | G05D 23/1924 | 700/300 |
| 2013/0167560 A1* | 7/2013 | Wong | G05B 15/02 | 62/56 |
| 2014/0316583 A1* | 10/2014 | Ambriz | F24F 11/30 | 700/277 |
| 2014/0332195 A1* | 11/2014 | Liberman | G05D 23/1917 | 165/267 |
| 2015/0134124 A1* | 5/2015 | Carter | G05D 23/1923 | 700/278 |
| 2015/0276253 A1* | 10/2015 | Montalvo | G06Q 10/06 | 700/276 |
| 2016/0102881 A1* | 4/2016 | Kim | F24F 11/30 | 165/218 |
| 2016/0195288 A1* | 7/2016 | Hamstra | G05B 13/026 | 700/276 |
| 2016/0209852 A1* | 7/2016 | Beyhaghi | G05D 23/1934 | |
| 2016/0246268 A1* | 8/2016 | ElBsat | G06F 17/16 | |
| 2016/0290667 A1* | 10/2016 | Tamaru | F24F 5/0046 | |
| 2016/0313751 A1* | 10/2016 | Risbeck | G05D 23/1917 | |
| 2016/0334122 A1* | 11/2016 | Shiel | F24F 11/0001 | |
| 2017/0363315 A1* | 12/2017 | Kawabata | F24F 11/89 | |
| 2018/0209675 A1* | 7/2018 | Ridder | F24F 11/62 | |
| 2018/0341255 A1* | 11/2018 | Turney | G05B 23/0283 | |
| 2018/0372363 A1* | 12/2018 | Park | F24F 11/63 | |

FOREIGN PATENT DOCUMENTS

| | | |
|---|---|---|
| CN | 104456852 A | 3/2015 |
| TW | M478116 U | 5/2014 |
| TW | I467121 B | 1/2015 |
| TW | I516886 B | 1/2016 |
| TW | 201610371 A | 3/2016 |

* cited by examiner

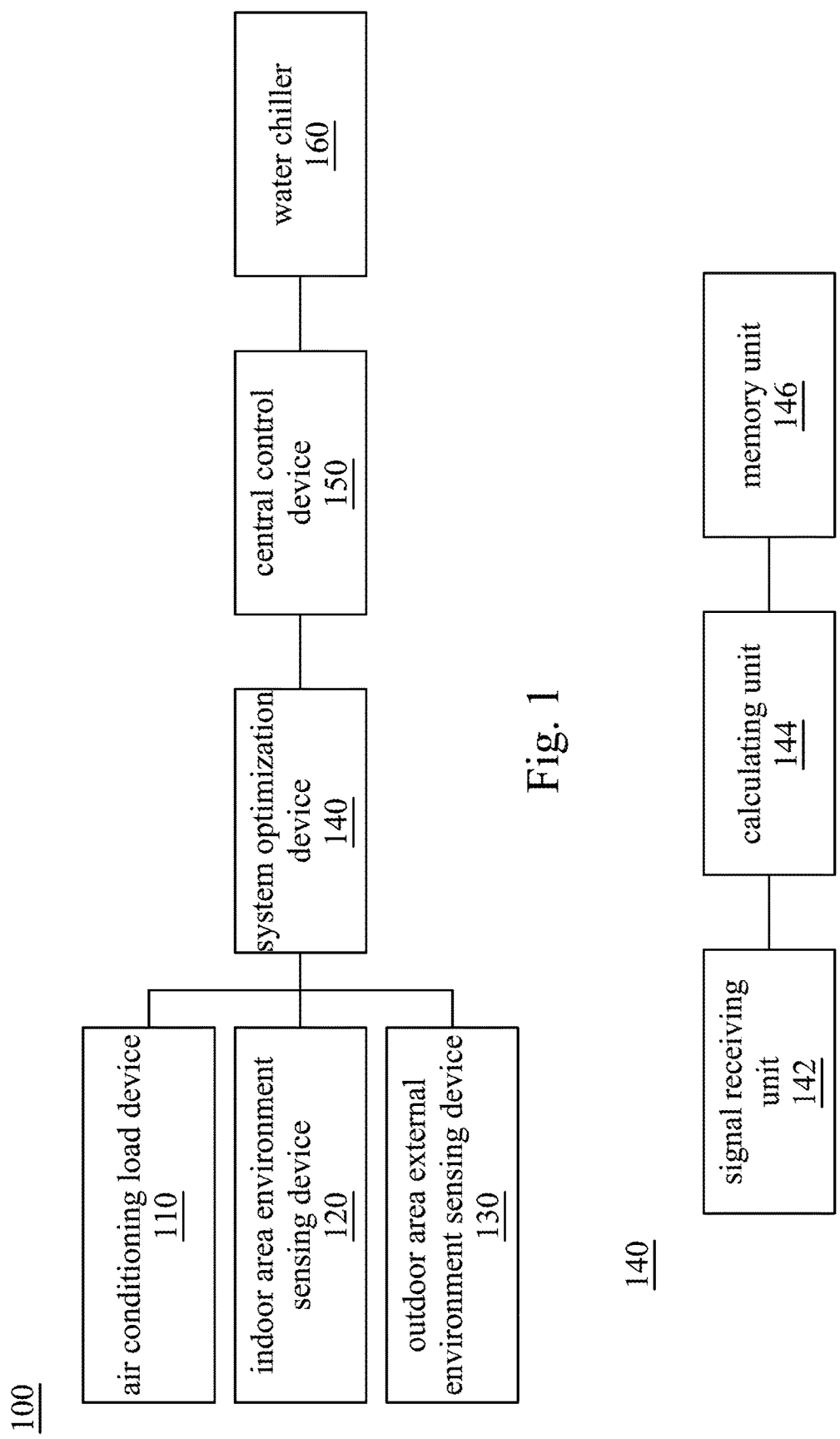

ADJUSTING SYSTEM AND METHOD FOR AN AIR CONDITIONING CHILLER

CROSS-REFERENCE TO RELATED APPLICATION

This application claims the priority benefit of Taiwan Application Ser. No. 106121303, filed Jun. 26, 2017, the full disclosure of which is incorporated herein by reference.

FIELD OF INVENTION

The invention relates to an adjusting system and an adjusting method. More particularly, the invention relates to an adjusting system and an adjusting method for maintaining the indoor humidity and temperature and adjusting the supply temperature of the outflow of the water chiller at the same time.

BACKGROUND

The water chiller occupies the largest proportion of the power consumption of the air conditioning system, and by raising the average supply temperature of the water chiller may get 2%~3% Celsius of the energy efficiency of the water chiller, therefore, adjusting the supply temperature of the water chiller has become a mainstream approach of the energy saving operation. However, in the past, the adjustment of the supply temperature of the water chiller mainly depends on the experience of managers. This adjustment may not be accurately according to on-site environment needs and may not be accurately in response to a variety of external and internal conditions for real-time adjustment.

In addition, during the heat removal process of the air conditioning system for the indoor space, except for cooling, the dehumidification process is also very important. If only the demand of the air conditioning load is taken as the basis for adjustment, it may not be able to ensure that the raised supply temperature may maintain the indoor space humidity conditions in the appropriate range, when the indoor humidity begin to rise, the breeding of mold organisms in the indoor environment may be improved, thus affecting the health of the indoor staffs.

Therefore, how to maintain the indoor humidity and temperature and adjust the supply temperature of the outflow of the water chiller at the same time efficiently, in order to reduce the power consumption of the air conditioning system, are problems to be improved in the field.

SUMMARY

An embodiment of this disclosure is to provide an adjusting system. The adjusting system is configured to adjust a supply temperature of an water chiller, in which the water chiller is disposed in a space area, and the adjusting system includes a system optimization device, a central control device, at least one air conditioning load device, at least one indoor area environment sensing device, and at least one outdoor area external environment sensing device. The at least one air conditioning load device is disposed in the space area, in which the at least one air conditioning load device is configured to obtain an air conditioning load parameter according to an air conditioning load in the space area and transmit the air conditioning load parameter through a first communication transmission interface. The at least one indoor area environment sensing device is disposed in the space area, in which the at least one indoor area environment sensing device is configured to obtain an indoor environment parameter and transmit the indoor environment parameter through a second communication transmission interface. The at least one outdoor area external environment sensing device is disposed outside the space area, in which the at least one outdoor area external environment sensing device is configured to obtain an outdoor environment parameter and transmit the outdoor environment parameter through a third communication transmission interface. The system optimization device receives the indoor environment parameter, the outdoor environment parameter, and the air conditioning load parameter, calculates to obtain a control parameter, and transmit the control parameter through a fourth communication transmission interface. The central control device receives the control parameter and controls the supply temperature of the water chiller according to the control parameter.

An embodiment of this disclosure is to provide an adjusting method. The adjusting method includes the following operations: obtaining at least one air conditioning load parameter according to an air conditioning load in a space area and transmitting the at least one air conditioning load parameter through a first communication transmission interface; obtaining at least one indoor environment parameter and transmitting the at least one indoor environment parameter through a second communication transmission interface; obtaining at least one outdoor environment parameter and transmitting the at least one outdoor environment parameter through a third communication transmission interface; receiving the at least one indoor environment parameter, the at least one outdoor environment parameter and the at least one air conditioning load parameter through a fourth communication interface; calculating to obtain a control parameter; and controlling a supply temperature of a water chiller according to the control parameter.

The embodiment of the present disclosure is to provide an adjusting system and an adjusting method, and in particular, an adjusting system and an adjusting method for maintaining the indoor humidity and temperature and adjusting the supply temperature of the outflow of the water chiller at the same time, in order to maintain the indoor humidity and temperature and adjust the supply temperature of the outflow of the water chiller at the same time efficiently, in order to reduce the power consumption of the air conditioning system.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

FIG. 1 is a schematic diagram illustrating an adjusting system according to some embodiments of the present disclosure.

FIG. 2 is a schematic diagram illustrating a system optimization device according to some embodiments of the present disclosure.

DETAILED DESCRIPTION

Figure 3:
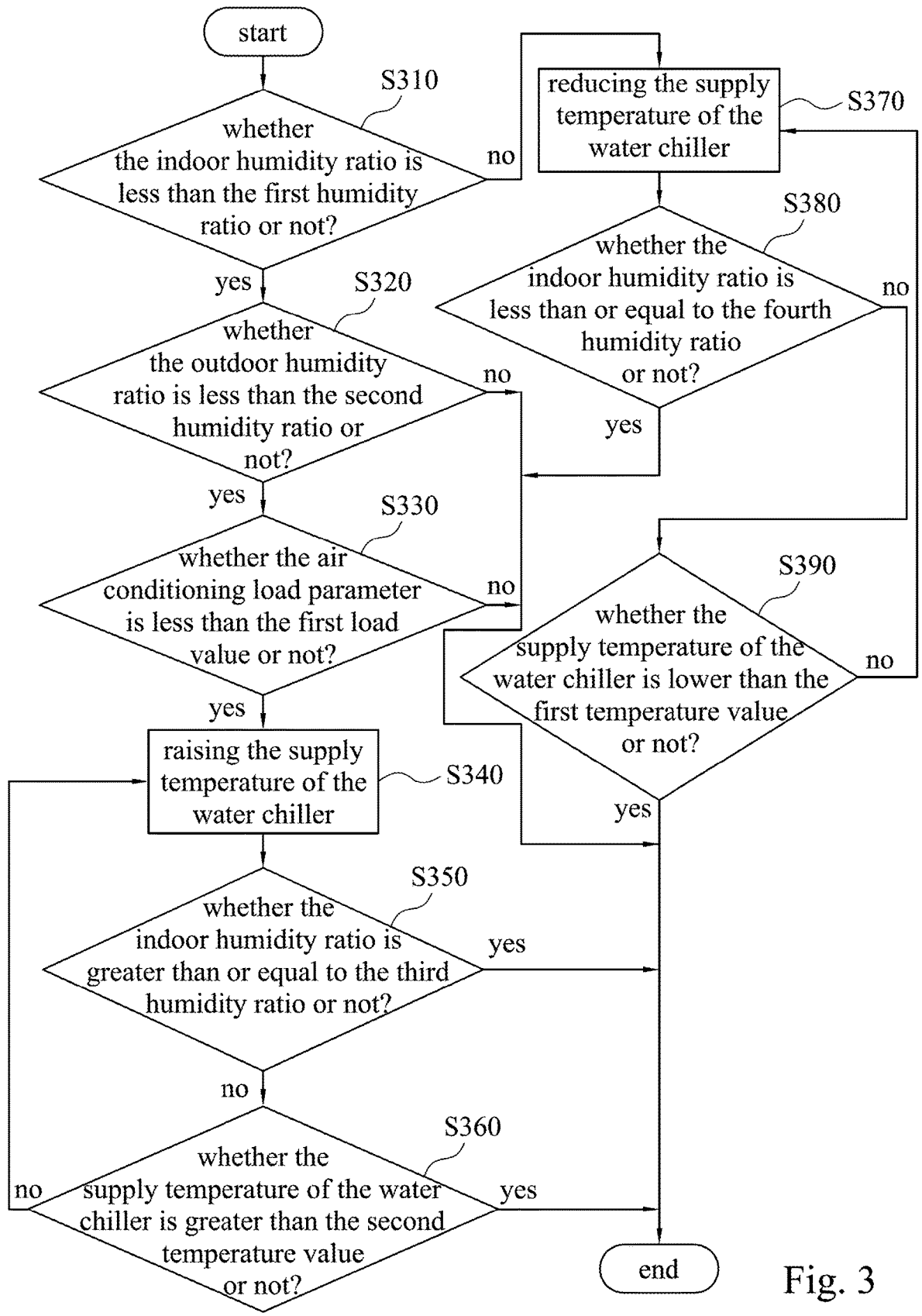
FIG. 3 is a flow chart illustrating an adjusting method according to some embodiments of the present disclosure.

The following disclosure provides many different embodiments, or examples, for implementing different features of the invention. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

The terms used in this specification generally have their ordinary meanings in the art, within the context of the invention, and in the specific context where each term is used. Certain terms that are used to describe the invention are discussed below, or elsewhere in the specification, to provide additional guidance to the practitioner regarding the description of the invention.

FIG. 1 is a schematic diagram illustrating an adjusting system 100 according to some embodiments of the present disclosure. In some embodiments, the adjusting system 100 includes an air conditioning load device 110, an indoor area environment sensing device 120, an outdoor area external environment sensing device 130, a system optimization device 140, a central control device 150, and a water chiller 160. The adjusting system 100 is configured to adjust the supply temperature of the water chiller 160 disposed in the space area. The adjusting system 100 shown in FIG. 1 is for illustrative purposes only and the present disclosure is not limited thereto.

In some embodiments, the air conditioning load device 110 and the indoor area environment sensing device 120 are provided in the space area, and the outdoor area external environment sensing device 130 is disposed outside the space area. In some embodiments, the space area means a space region where the water chiller 160 is disposed, outside the space area means outside the space region where the water chiller 160 is disposed. For example, if the water chiller 160 is disposed in a room, the space in the room is in the space area, and the space outside the room is outside the space area.

In some embodiments, the air conditioning load device 110 obtains air conditioning load parameters according to an air conditioning load within a space area and transmits the air conditioning load parameters to the system optimization device 140 through a first communication transmission interface (not shown). In some embodiments, the air conditioning load parameters may be the air conditioning load rate. In some embodiments, the first communication transmission interface may be a wire transmission interface or a wireless transmission interface.

In some embodiments, the indoor area environment sensing device 120 is configured to obtain indoor environment parameters and transmit the indoor environment parameters to the system optimization device 140 through a second communication transmission interface (not shown). In some embodiments, the indoor environment parameters may be indoor temperature, indoor humidity, indoor humidity ratio, and/or indoor illumination. In some embodiments, the second communication transmission interface may be a wire transmission interface or a wireless transmission interface.

In some embodiments, the outdoor area external environment sensing device 130 is configured to obtain outdoor environment parameters and transmit the outdoor environment parameters to the system optimization device 140 through a third communication transmission interface (not shown). In some embodiments, the outdoor environment parameters may be outdoor temperature, outdoor humidity, outdoor humidity ratio, and/or outdoor illumination. In some embodiments, the third communication transmission interface may be a wire transmission interface or a wireless transmission interface.

In some embodiments, the system optimization device 140 receives the indoor environment parameters, the outdoor environment parameters, and the air conditioning load parameters, calculates to obtain a control parameter, and transmits the control parameter to the central control device (not shown) through a fourth communication transmission interface 150. In some embodiments, the fourth communication transmission interface may be a wire transmission interface or a wireless transmission interface.

Reference is made to FIG. 2. FIG. 2 is a schematic diagram illustrating a system optimization device according to some embodiments of the present disclosure. As illustrated in FIG. 2, the system optimization device 140 includes a signal receiving unit 142, a calculating unit 144, and a memory unit 146. The system optimization device 140 illustrated in FIG. 2 is for illustrative purposes only and the present disclosure is not limited thereto.

In some embodiments, the calculating unit 144 is coupled to the signal receiving unit 142. The signal receiving unit 142 receives the indoor environment parameters, the outdoor environment parameters and the air conditioning load parameters. The memory unit 146 stores at least one preset parameter value. In some embodiments, when the indoor environment parameters, the outdoor environment parameters, and the air conditioning load parameters each satisfy a value of the at least one preset parameter value, the calculation unit 144 calculates to obtain a control parameter and transmits the control parameter to the central control device 150. The central control device 150 receives the control parameter and controls the supply temperature of the water chiller 160 according to the control parameter.

In some embodiments, the central control device 150 reduces the supply temperature of the water chiller 160 when the indoor humidity parameter of the indoor environment parameter is greater than or equal to the first humidity ratio of the preset parameter values. For example, when the first humidity ratio is 12 g/kg and the indoor humidity ratio is 13 g/kg, the system optimization device 140 calculates the control parameter and transfers the control parameter to the central control device 150, and the central control device 150 reduce the supply temperature of the water chiller 160 is reduced according to the control parameter.

In some embodiments, when the indoor humidity parameter of the indoor environment parameter is less than the first humidity ratio of the preset parameter values, the outdoor humidity ratio of the outdoor environment parameter is less than the second humidity ratio of the preset parameter values, and the air conditioning load parameter is less than the first load value of the preset parameter values, the central control device 150 adjusts the supply temperature of the water chiller 160. For example, when the first humidity ratio is 12 g/kg, the second humidity ratio is 14 g/kg, and the first load value is 80%, if the indoor humidity ratio is 11 g/kg, the outdoor humidity ratio is 11 g/kg, and the air conditioning load parameter is 60%, the system optimization device 140 calculates the control parameter and transfers the control parameters to the central control device 150, and the central control device 150 raises the supply temperature of the water chiller 160 according to the control parameter.

In some embodiments, the central control device 150 stops reducing the supply temperature of the water chiller 160 when the supply temperature of the water chiller 160 is below the first temperature value of the preset parameter values. For example, when the first temperature value is 7°

C., the central control device 150 stops reducing the supply temperature of the water chiller 160 if the supply temperature of the water chiller 160 is 6° C.

In some embodiments, the central control device 150 stops raising the supply temperature of the water chiller 160 when the supply temperature of the water chiller 160 is greater than the second temperature value of the preset parameter values. For example, when the second temperature value is 12° C., the central control device 150 stops raising the supply temperature of the water chiller 160 if the supply temperature of the water chiller 160 is 13° C.

In some embodiments, the system optimization device 140 periodically calculates the control parameter according to the indoor environment parameters, the outdoor environment parameters, and the air conditioning load parameters, and transmits the control parameter to the central control device 150 to adjust the supply temperature of the water chiller.

Reference is made to FIG. 3. FIG. 3 is a flow chart illustrating an adjusting method 300 according to some embodiments of the present disclosure. The adjusting method 300 includes operations S310 to S390.

S310: determining whether the indoor humidity ratio is less than the first humidity ratio or not;

S320: determining whether the outdoor humidity ratio is less than the second humidity ratio or not;

S330: determining whether the air conditioning load parameter is less than the first load value or not;

S340: raising the supply temperature of the water chiller;

S350: determining whether the indoor humidity ratio is greater than or equal to the third humidity ratio or not;

S360: determining whether the supply temperature of the water chiller is greater than the second temperature value or not;

S370: reducing the supply temperature of the water chiller;

S380: determining whether the indoor humidity ratio is less than or equal to the fourth humidity ratio or not; and S390: determining whether the supply temperature of the water chiller is lower than the first temperature value or not.

For the convenience of explanation and understanding, the adjusting method 300 will be described in detail in conjunction with FIG. 1 in the following paragraphs.

Reference is made to FIG. 1 and FIG. 3. In operation S310, determining whether the indoor humidity ratio is less than the first humidity ratio or not. In some embodiments, operation S310 may be performed by the system optimization device 140. For example, the indoor area environment sensing device 120 obtains the indoor humidity ratio in the space area and transmits the indoor humidity ratio to the system optimization device 140 through the second communication transmission interface, and the system optimization device 140 determines whether the indoor humidity ratio is less than the first humidity ratio or not. If the determination result of operation S310 is that the indoor humidity ratio is less than the first humidity ratio, operation S320 is performed. If the determination result of operation S310 is that the indoor humidity ratio is not less than the first humidity ratio, operation S370 is performed. For example, when the first humidity ratio is 12 g/kg and the indoor humidity ratio is 11 g/kg, the determination result of operation S310 is that the indoor humidity ratio is less than the first humidity ratio, and if the indoor humidity ratio is 13 g/kg, the determination result of the operation S310 is that the indoor humidity ratio is not less than the first humidity ratio.

In operation S320, it is determined whether the outdoor humidity ratio is less than the second humidity ratio or not. In some embodiments, operation S320 may be performed by the system optimization device 140. For example, the outdoor area external environment sensing device 130 obtains the outdoor humidity ratio outside the space area and transmits the outdoor humidity ratio to the system optimization device 140 through the third communication transmission interface, and the optimization system 140 determines whether the outdoor humidity ratio is less than the second humidity ratio or not. If the determination result of operation S320 is that the outdoor humidity ratio is less than the second humidity ratio, operation S330 is performed. If the determination result of operation S320 is that the outdoor humidity ratio is not less than the second humidity ratio, the adjusting method 300 is terminated. For example, when the second humidity ratio is 14 g/kg and the outdoor humidity ratio is 13 g/kg, the determination result of operation S320 is that the outdoor humidity ratio is less than the second humidity ratio. If the outdoor humidity ratio is 15 g/kg, the determination result of operation S320 is that the outdoor humidity ratio is not less than the second humidity ratio.

In operation S330, determining whether the air conditioning load parameter is less than the first load value or not. In some embodiments, operation S330 may be performed by the system optimization device 140. For example, the air conditioning load device 110 obtains air conditioning load parameters and transmits the air conditioning load parameters to the system optimization device 140 through the first communication transmission interface, and the system optimization device 140 determines whether the air conditioning load parameter is less than the first load value. If the determination result of operation S330 is that the air conditioning load parameter is less than the first load value, operation S340 is performed. If the determination result of operation S330 is that the air conditioning load parameter is not less than the first load value, the adjusting method 300 is terminated. For example, when the first load value is 80%, if the air conditioning load parameter is 60%, the determination result of operation S330 is that the air conditioning load parameter is less than the first load value, and if the air conditioning load parameter is 90%, the determination result of operation S330 is that the air conditioning load parameter is not less than the first load value.

In operation S340, raising the supply temperature of the water chiller. In some embodiments, operation S340 may be performed by the central control device 150. For example, the system optimization device 140 calculates the control parameter according to the indoor environment parameters, the outdoor environment parameters, and the air conditioning load parameters, and transmits the control parameters to the central control device 150 through the fourth communication transmission interface. After receiving the control parameter, the central control device 150 raises the supply temperature of the water chiller 160 according to the control parameter. In some implementations, the control parameter includes the degree of adjustment of the effluent temperature of the water chiller 160. For example, when the control parameter is raising 0.5° C., the central control device 150 adjusts the supply temperature of the water chiller 160 to raise 0.5° C. according to the control parameters.

In operation S350, determining whether the indoor humidity ratio is greater than or equal to the third humidity ratio or not. In some embodiments, operation S350 may be performed by the system optimization device 140. For example, the indoor area environment sensing device 120 obtains the indoor humidity ratio in the space area and transmits the indoor humidity ratio to the system optimization device 140 through the second communication transmission interface, and the system optimization device 140 determines whether the indoor humidity ratio is greater than or equal to the third humidity ratio or not. If the determination result of operation S350 is that the indoor humidity ratio is greater than or equal to the third humidity ratio, the adjusting method 300 is terminated. If the determination result of operation S350 is that the indoor humidity ratio is not greater than or equal to the third humidity ratio, operation S360 is performed. For example, when the third humidity ratio is 11.5 g/kg and the indoor humidity ratio is 12 g/kg, the determination result of operation S350 is that the indoor humidity ratio is greater than or equal to the third humidity ratio, and if the indoor humidity ratio is 11 g/kg, the determination result of operation S350 is that the indoor humidity ratio is not greater than or equal to the third humidity ratio.

In operation S360, determining whether the supply temperature of the water chiller is greater than the second temperature value or not. In some embodiments, operation S360 may be performed by the system optimization device 140. If the determination result of operation S360 is that the supply temperature of the water chiller 160 is greater than the second temperature value, the adjusting method 300 is terminated. If the determination result of operation S360 is that the supply temperature of the water chiller 160 is not greater than the second temperature value, operation S340 is performed. For example, when the second temperature value is 12° C., if the supply temperature of the water chiller 160 is 13° C., the determination result of operation S360 is that the supply temperature of the water chiller 160 is greater than the second temperature value. If the water chiller 160 is 11° C., the determination result of operation S360 is that the supply temperature of the water chiller 160 is not greater than the second temperature value.

In operation S370, the supply temperature of the water chiller is lowered. In some embodiments, operation S370 may be performed by the central control device 150. For example, the system optimization device 140 calculates the control parameter according to the indoor environment parameters, the outdoor environment parameters and the air conditioning load parameters, and the system optimization device 140 transmits the control parameter to the central control device 150 through the fourth communication transmission interface. After receiving the control parameter, the central control device 150 raises the supply temperature of the water chiller 160 according to the control parameter. In some embodiments, the control parameter includes the degree of adjustment of the supply temperature of the water chiller 160. For example, when the control parameter is reducing 0.5° C., the central control device 150 reduces the supply temperature of the water chiller 160 by 0.5° C. according to the control parameter.

In operation S380, determining whether the indoor humidity ratio is less than or equal to the fourth humidity ratio or not. In some embodiments, operation S380 may be performed by the system optimization device 140. For example, the indoor area environment sensing device 120 obtains the indoor humidity ratio in the space area and transmits the indoor humidity ratio to the system optimization device 140 through the second communication transmission interface, and the system optimization device 140 determines whether the indoor humidity ratio is less than or equal to the fourth humidity ratio. If the determination result of operation S380 is that the indoor humidity ratio is less than or equal to the fourth humidity ratio, the adjusting method 300 is terminated. If the determination result of operation S380 is that the indoor humidity ratio is not less than or equal to the fourth humidity ratio, operation S390 is performed. For example, when the fourth humidity ratio is 11 g/kg and the indoor humidity ratio is 10 g/kg, the determination result of operation S380 is that the indoor humidity ratio is less than or equal to the fourth humidity ratio. If the indoor humidity ratio is 12 g/kg, the determination result of operation S380 is that the indoor humidity ratio is not less than or equal to the fourth humidity ratio.

In operation S390, determining whether the supply temperature of the water chiller is lower than the first temperature value or not. In some embodiments, operation S390 may be performed by the system optimization device 140. If the determination result of operation S390 is that the supply temperature of the water chiller 160 is lower than the first temperature value, the adjusting method 300 is terminated. If the determination result of operation S390 is that the supply temperature of the water chiller 160 is not lower than the first temperature value, operation S370 is performed. For example, when the first temperature value is 7° C., if the supply temperature of the water chiller 160 is 6° C., the determination result of operation S390 is that the supply temperature of the water chiller 160 is lower than the first temperature value, and if the water chiller 160 is 8° C., the determination result of operation S390 is that the supply temperature of the water chiller 160 is not lower than the first temperature value.

Figure 4:
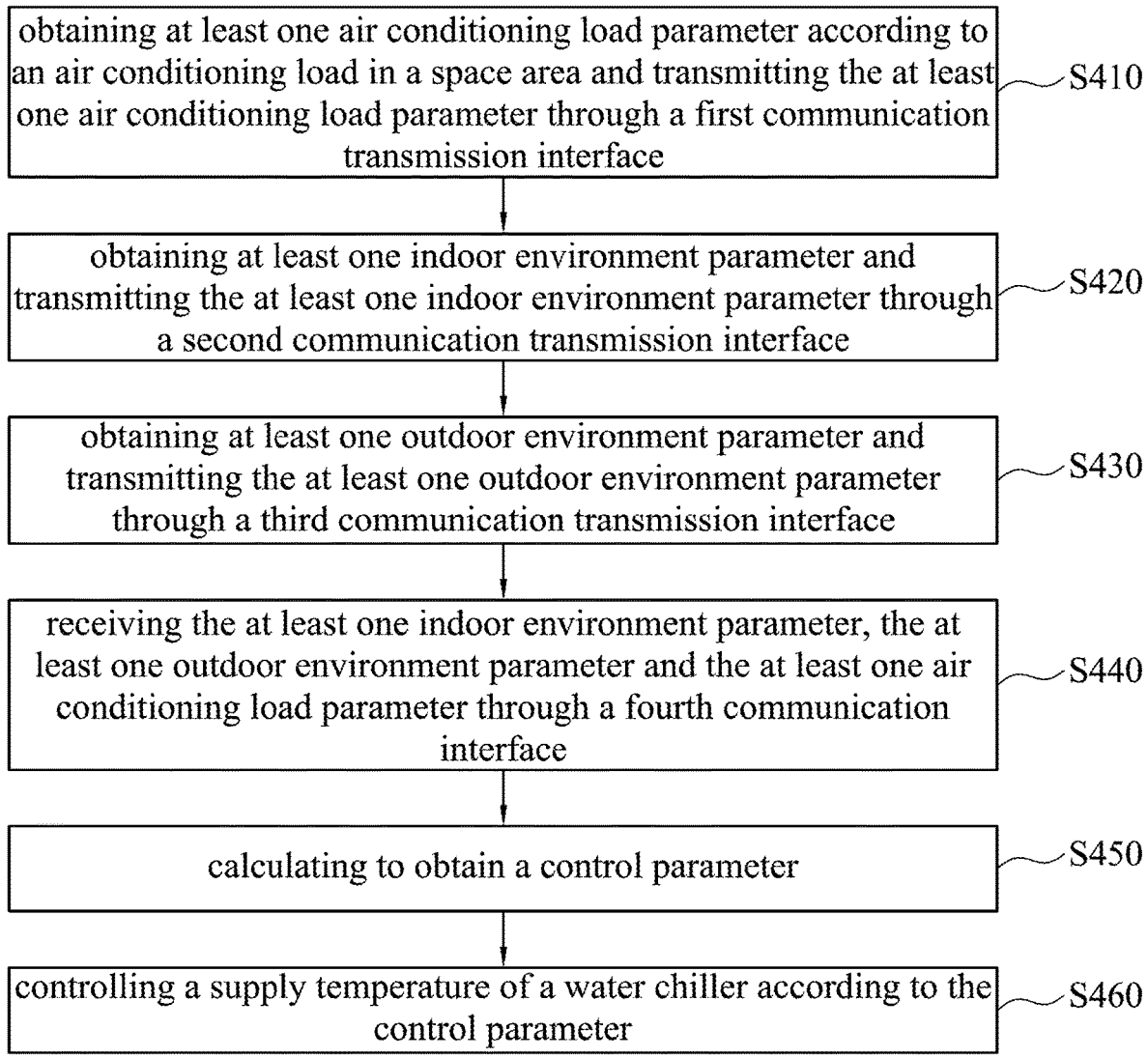
FIG. 4 is a flow chart illustrating an adjusting method according to some embodiments of the present disclosure.

Reference is made to FIG. 4. FIG. 4 is a flow chart illustrating an adjusting method 400 according to some embodiments of the present disclosure. The adjusting method 400 includes operations S410 to S460.

S410: obtaining at least one air conditioning load parameter according to an air conditioning load in a space area and transmitting the at least one air conditioning load parameter through a first communication transmission interface;

S420: obtaining at least one indoor environment parameter and transmitting the at least one indoor environment parameter through a second communication transmission interface;

S430: obtaining at least one outdoor environment parameter and transmitting the at least one outdoor environment parameter through a third communication transmission interface;

S440: receiving the at least one indoor environment parameter, the at least one outdoor environment parameter and the at least one air conditioning load parameter through a fourth communication interface;

S450: calculating to obtain a control parameter; and

S460: controlling a supply temperature of a water chiller according to the control parameter.

For the convenience of explanation and understanding, the adjusting method 400 will be described in detail in conjunction with FIG. 1 in the following paragraphs.

In operation S410, obtaining at least one air conditioning load parameter according to an air conditioning load in a space area and transmitting the at least one air conditioning load parameter through a first communication transmission interface. For example, the air conditioning load device 110 may obtain at least one air conditioning load parameter according to an air conditioning load in a space area and transmit the at least one air conditioning load parameter to the system optimization device 140 through a first communication transmission interface.

In operation S420, obtaining at least one indoor environment parameter and transmitting the at least one indoor environment parameter through a second communication transmission interface. For example, the indoor area environment sensing device 120 may obtain at least one indoor environment parameter and transmit the at least one indoor environment parameter to the system optimization device 140 through a second communication transmission interface.

In operation S430, obtaining at least one outdoor environment parameter and transmitting the at least one outdoor environment parameter through a third communication transmission interface. For example, the outdoor area external environment sensing device 130 may obtain at least one outdoor environment parameter and transmit the at least one outdoor environment parameter to the system optimization device 140 through a third communication transmission interface.

In operation S440, receiving the at least one indoor environment parameter, the at least one outdoor environment parameter and the at least one air conditioning load parameter through a fourth communication interface. For example, the system optimization device 140 may receive the at least one indoor environment parameter, the at least one outdoor environment parameter and the at least one air conditioning load parameter through a fourth communication interface.

In operation S450, calculating to obtain a control parameter. For example, the system optimization device 140 may calculate the control parameter according to the at least one indoor environment parameter, the at least one outdoor environment parameter and the at least one air conditioning load parameter.

In some embodiments, after the control parameter is calculated, the system optimization device 140 may transmit the control parameter to the central control device 150. Reference is made to FIG. 2 and FIG. 4. In some embodiments, the signal receiving unit 142 receives the indoor environment parameters, the outdoor environment parameters and the air conditioning load parameters. The memory unit 146 stores at least one preset parameter value. In some embodiments, when the indoor environment parameters, the outdoor environment parameters, and the air conditioning load parameters each satisfy a value of the at least one preset parameter value, the calculation unit 144 calculates to obtain a control parameter and transmits the control parameter to the central control device 150.

In operation S460, controlling a supply temperature of a water chiller according to the control parameter. For example, central control device 150 may control the supply temperature of the water chiller 160 according to the control parameter.

The detailed operations of operations S410-S460 are as described above and will not be repeated here.

The above-mentioned supply temperature, the first temperature value, the second temperature value, the first humidity ratio, the second humidity ratio, the third humidity ratio, and the fourth humidity ratio are for illustrative purposes only, and the present disclosure is not limited thereto.

In some embodiments, the adjusting system 100 further includes several air conditioning load devices 110, several indoor area environment sensing devices 120, several outdoor area external environment sensing devices 130, and several water chiller 160. The central control device 150 may control the supply temperature of several water chillers 160.

In some embodiments, the wire transmission interface includes twisted pairs, coaxial cables, optical fibers, and home plugs, but the present disclosure is not limited thereto.

In some embodiments, the wireless transmission interface includes mobile communication (3G/4G/5G), ZigBeeLoRa, Sigfox, Telensa, Global Mobile Communication System (WiFi), and Bluetooth, but the present disclosure is not limited thereto.

In some embodiments, the indoor area environment sensing device 120 may be a device or circuit with the function of obtaining environment parameters such as temperature, humidity, humidity ratio and/or illumination, or other equivalent functions. In some embodiments, the outdoor area external environment sensing device 130 may be a device or circuit with the function of obtaining environment parameters such as temperature, humidity, humidity ratio and/or illumination, or other equivalent functions. In some embodiments, the air conditioning load device 110 may be a device or circuit with the function of obtaining the air conditioning load parameter or the air conditioning load rate, or other equivalent functions. In some embodiments, the system optimization device 140 may be a device or circuit with the function of calculation, signal reception, data storage, or other equivalent functions. In some embodiments, the central control device 150 may be a device or circuit with the function of controlling water chiller 160 or other equivalent function.

In some embodiments, the signal receiving unit 142 may be a device or circuit with the function of signal reception or other equivalent functions. In some embodiments, the calculating unit 144 may be a device or circuit with the function of calculating or other equivalent function. In some embodiments, the memory unit 146 may be a device or circuit with the function of memory, data storage, or other equivalent functions.

According to the embodiments of the present disclosure, it is understood that the embodiment of the present disclosure is to provide an adjusting system and an adjusting method, and in particular, an adjusting system and an adjusting method for maintaining the indoor humidity and temperature and adjusting the supply temperature of the outflow of the water chiller at the same time, in order to maintain the indoor humidity and temperature and adjust the supply temperature of the outflow of the water chiller at the same time efficiently, in order to reduce the power consumption of the air conditioning system.

In this document, the term "coupled" may also be termed as "electrically coupled", and the term "connected" may be termed as "electrically connected". "Coupled" and "connected" may also be used to indicate that two or more elements cooperate or interact with each other. It will be understood that, although the terms "first," "second," etc., may be used herein to describe various elements, these elements should not be limited by these terms. These terms are used to distinguish one element from another. For example, a first element could be termed a second element, and, similarly, a second element could be termed a first element, without departing from the scope of the embodiments. As used herein, the term "and/or" includes any and all combinations of one or more of the associated listed items.

In addition, the above illustrations comprise sequential demonstration operations, but the operations need not be performed in the order shown. The execution of the operations in a different order is within the scope of this disclosure. In the spirit and scope of the embodiments of the present disclosure, the operations may be increased, substituted, changed and/or omitted as the case may be.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. An adjusting system configured to adjust a supply temperature of a water chiller, wherein the water chiller is disposed in a space area, and the adjusting system comprises:
   a system optimization device, wherein the system optimization device comprises:
   a signal receiving unit configured to receive one or more indoor environment parameters, one or more environment parameters and an air conditioning load parameter;
   a calculating unit coupled to the signal receiving unit; and
   a memory unit configured to store preset parameter values;
   a central control device;
   at least one air conditioning load device disposed in the space area, wherein the at least one air conditioning load device is configured to obtain the air conditioning load parameter according to an air conditioning load in the space area and transmit the air conditioning load parameter through a first communication transmission interface;
   at least one indoor area environment sensing device disposed in the space area, wherein the at least one indoor area environment sensing device is configured to obtain the one or more indoor environment parameters comprising a first indoor environment parameter and transmit the first indoor environment parameter through a second communication transmission interface, wherein the first indoor environment parameter is an indoor humidity ratio; and
   at least one outdoor area external environment sensing device disposed outside the space area, wherein the at least one outdoor area external environment sensing device is configured to obtain the one or more outdoor environment parameters comprising a first outdoor environment parameter and transmit the first outdoor environment parameter through a third communication transmission interface, wherein the first outdoor environment parameter is an outdoor humidity ratio;
   wherein the system optimization device receives the first indoor environment parameter, the first outdoor environment parameter, and the air conditioning load parameter, wherein, when the indoor humidity ratio of the first indoor environment parameter is less than a first humidity ratio of the preset parameter values, the outdoor humidity ratio of the first outdoor environment parameter is less than a second humidity ratio of the preset parameter values, and the air conditioning load parameter is less than a first load value of the preset parameter values, the calculating unit calculates to obtain a control parameter, and the system optimization device transmits the control parameter through a fourth communication transmission interface and the central control device receives the control parameter and controls the supply temperature of the water chiller according to the control parameter, wherein the central control device raises the supply temperature of the water chiller according to the received control parameter.

2. The adjusting system of claim 1, wherein the one or more indoor environment parameters further comprises a second indoor environment parameter selected from the group consisting of an indoor temperature, an indoor humidity and an indoor illuminance.

3. The adjusting system of claim 1, wherein the one or more outdoor environment parameters further comprises a second outdoor environment parameter selected from the group consisting of an outdoor temperature, an outdoor humidity and an outdoor illuminance.

4. The adjusting system of claim 1, wherein at least one of the first communication transmission interface, the second communication transmission interface, the third communication transmission interface and the fourth communication transmission interface is a wire transmission interface.

5. The adjusting system of claim 1, wherein at least one of the first communication transmission interface, the second communication transmission interface, the third communication transmission interface and the fourth communication transmission interface is a wireless transmission interface.

6. The adjusting system of claim 1, wherein when the indoor humidity ratio of the first indoor environment parameter is greater than or equal to the first humidity ratio of the preset parameter values, the central control device reduces the supply temperature of the water chiller.

7. The adjusting system of claim 6, wherein when the supply temperature of the water chiller is lower than a first temperature value of the preset parameter values, the central control device stops reducing the supply temperature of the water chiller.

8. The adjusting system of claim 1, wherein when the supply temperature of the water chiller is greater than a second temperature value of the preset parameter values, the central control device stops raising the supply temperature of the water chiller.

9. An adjusting method, comprising:
   obtaining at least one air conditioning load parameter according to an air conditioning load in a space area and transmitting the at least one air conditioning load parameter through a first communication transmission interface;
   obtaining one or more indoor environment parameters comprising a first indoor environment parameter and transmitting the first indoor environment parameter through a second communication transmission interface, wherein the first indoor environment parameter is an indoor humidity ratio;
   obtaining one or more outdoor environment parameters comprising a first outdoor environment parameter and transmitting the first outdoor environment parameter through a third communication transmission interface, wherein the first outdoor environment parameter is an outdoor humidity ratio;
   receiving the one or more indoor environment parameters, the one or more outdoor environment parameter and the at least one air conditioning load parameter through a fourth communication interface;
   determining that each of the one or more indoor environment parameters, the one or more outdoor environment parameters and the at least one air conditioning load parameter satisfy a value of preset parameter values respectively;

responsive to determining that each of the one or more indoor environment parameters, the one or more outdoor environment parameters and the at least one air conditioning load parameter satisfy the value of the preset parameter values respectively, calculating to obtain a control parameter;

determining the first indoor humidity ratio of the first indoor environment parameter is less than a first humidity ratio of the preset parameter values, the outdoor humidity ratio of the first outdoor environment parameter is less than a second humidity ratio of the preset parameter values, and the at least one air conditioning load parameter is less than a first load value of the preset parameter values;

responsive to determining that the first indoor humidity ratio of the first indoor environment parameter is less than the first humidity ratio of the preset parameter values, the outdoor humidity ratio of the first outdoor environment parameter is less than the second humidity ratio of the preset parameter values, and the at last one air conditioning load parameter is less than the first load value of the preset parameter values, calculating the control parameter and raising a supply temperature of a water chiller.

10. The adjusting method of claim 9, wherein the one or more indoor environment parameters further comprises a second indoor environment parameter selected from the group consisting of an indoor temperature, an indoor humidity and an indoor illuminance.

11. The adjusting method of claim 9, wherein the one or more outdoor environment parameters further comprises a second outdoor environment parameter selected from the group consisting of an outdoor temperature, an outdoor humidity and an outdoor illuminance.

12. The adjusting method of claim 9, wherein at least one of the first communication transmission interface, the second communication transmission interface, the third communication transmission interface and a fourth communication transmission interface is a wire transmission interface.

13. The adjusting method of claim 9, wherein at least one of the first communication transmission interface, the second communication transmission interface, the third communication transmission interface and a fourth communication transmission interface is a wireless transmission interface.

14. The adjusting method of claim 9, further comprising:
reducing the supply temperature of the water chiller when an indoor humidity ratio of the first indoor environment parameter is greater than or equal to a first humidity ratio of the preset parameter values, by a central control device.

15. The adjusting method of claim 14, further comprising:
stopping reducing the supply temperature of the water chiller when the supply temperature of the water chiller is lower than a first temperature value of the preset parameter values.

16. The adjusting method of claim 9, further comprising:
stopping raising the supply temperature of the water chiller when the supply temperature of the water chiller is greater than a second temperature value of the preset parameter values.

* * * * *